Jan. 1, 1929.

W. J. FRIEND 1,697,500

AUDIO AMPLIFICATION APPARATUS FOR VARIOUS SOUNDS

Filed June 23, 1927

INVENTOR:
WILLIAM J. FRIEND
BY
George W. Saywell
ATTORNEY.

Jan. 1, 1929.                                              1,697,500
W. J. FRIEND
AUDIO AMPLIFICATION APPARATUS FOR VARIOUS SOUNDS
Filed June 23, 1927          5 Sheets-Sheet 2

INVENTOR:
WILLIAM J. FRIEND
BY
George W. Saywell
ATTORNEY.

Jan. 1, 1929.

W. J. FRIEND 1,697,500

AUDIO AMPLIFICATION APPARATUS FOR VARIOUS SOUNDS

Filed June 23, 1927    5 Sheets-Sheet 3

INVENTOR:
WILLIAM J. FRIEND
BY
George W. Saywell
ATTORNEY.

Jan. 1, 1929.

W. J. FRIEND 1,697,500

AUDIO AMPLIFICATION APPARATUS FOR VARIOUS SOUNDS

Filed June 23, 1927     5 Sheets-Sheet 5

INVENTOR:
WILLIAM J. FRIEND

BY George W. Saywell
ATTORNEY.

Patented Jan. 1, 1929.

1,697,500

UNITED STATES PATENT OFFICE.

WILLIAM J. FRIEND, OF NORWALK, OHIO.

AUDIO-AMPLIFICATION APPARATUS FOR VARIOUS SOUNDS.

Application filed June 23, 1927. Serial No. 200,849.

This invention relates to apparatus for amplifying various sound waves and reproducing the same at points comparatively far removed from the organ. The invention is particularly adaptable for use with church organs or in theaters having a pipe organ, and is especially adaptable for antiphonal singing, for special organ effects, for reproduction of organ music in adjacent buildings, for services held outside the church or organ building, such as open air Christmas carol services, and is serviceable for the amplification of voices or instruments to produce echo effects from a sound proof production room or compartment. Also, it is very adaptable for advertising purposes in reproducing music in front of theaters, etc. The following description and the accompanying drawings illustrate the invention for use in amplifying sounds which emanate from an echo-organ. The apparatus partakes of the character of a modern echo-organ in that it is placed at a distance from the main body of the instrument, with which it is electrically connected, and may properly be termed an "electro-pneumatic echo organ."

This electro-pneumatic echo organ may be called a sympathetic amplifier, since it receives its power from the sympathetic vibration of microphones placed within the pipe organ. It might also be called an electrical resonator since it acts through electrical resonance. The sympathetic vibrations of the microphone disc are changed into electrical impulses and are carried through a system of wires and audio-amplifying apparatus to a power rectifying and amplifying loud speaker where the sound is accurately reproduced at a material distance from the organ. The pick-up is based upon the well known principle that the resistance of carbon changes with the pressure so that when the microphone disc vibrates, the changes in resistance cause corresponding changes in the current which traverses the circuit. The pick-up in the form of apparatus illustrated is made by a small electro-magnetic generator which is caused to vibrate by the sympathetic action of a disc or cone connected to a small piece of metal which vibrates back and forth through a magnetic field thus inducing the small currents. This is the use in a reverse way of the well-known loud speaker.

The micro-generators, of which there are two for the organ music reproduction, are placed in a very special position. One of them is placed within the sound proof swell-box containing the swell stops of the organ pipes and the other is placed within the sound proof chamber containing the stops of the choir organ pipes. When the shutters of either of these sound proof chambers are tightly closed, the sounds from the pipes being played therein cannot be heard by the congregation in the main auditorium, but are reproduced from the amplifying loud speaker in the choir room or other desired remote point with any degree of intensity and loudness desired.

One very important use of my improved apparatus and the use for which the original apparatus was designed is that of keeping a choir in time and tune with the main organ in starting processionals or ending recessionals in a room too far distant from the main organ to permit satisfactory hearing of the music from the latter under normal conditions. The accompanying drawings, together with the description hereinafter given, will illustrate in detail this use of my apparatus.

The pick-up is made by two loud speakers, worked in a reverse way as small generators, obtaining their power from vibrating paper cones to which are attached small metal cylinders which move back and forth through magnetic fields, thus inducing small currents corresponding to the sounds produced by the pipe organ. These micro-generators in the sound-proof chambers are freed from the vibrations of a permanent or solid base by being spring-mounted or supported on thick felt pads. The electro-pneumatic echo organ may be a standard auditorium type—rectifier—power amplifier unit—all in one cabinet. The audio-amplification system may be any standard type and the one illustrated consists of two transformers, having a frequency range of from 16 to 10,000 vibrations per second, in connection with two radio tubes, an A battery, a B eliminator, a C battery, and Davin resistance block, connected in the usual way to make an audio-amplifying circuit. The cabinet containing this amplifying apparatus is mounted on a vibrationless support such as a masonry building pier.

Having thus described in general terms the make-up and purpose of my improved audio-amplification apparatus for use in amplifying sounds from an electro-pneumatic echo organ, I shall describe, with the aid of reference to the accompanying drawings, a special form of apparatus in which the principle of my invention is embodied, explaining also how the same is operated, the description and drawings showing but one of the forms in which this principle may be utilized.

Figure 12:
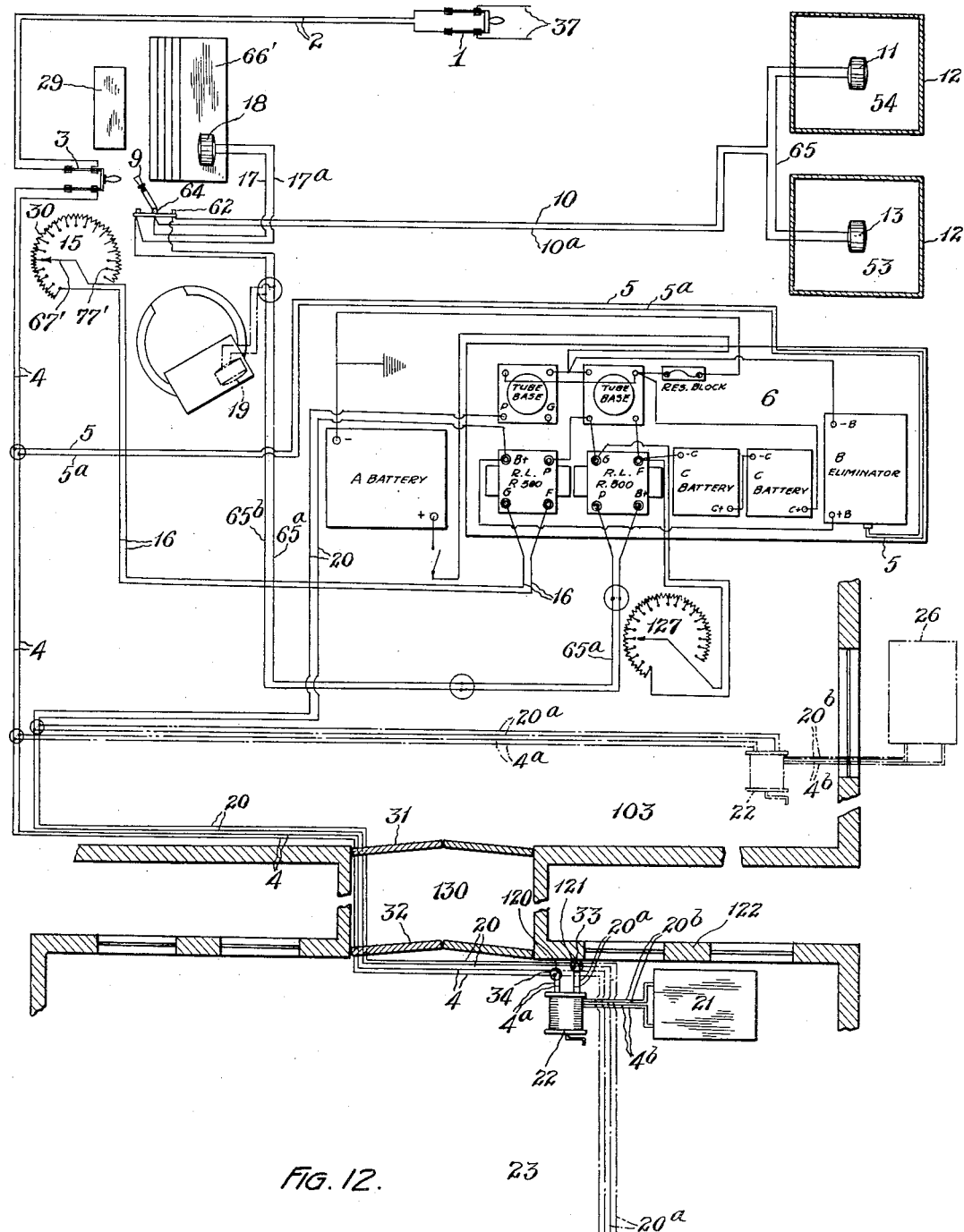
Figure 13:
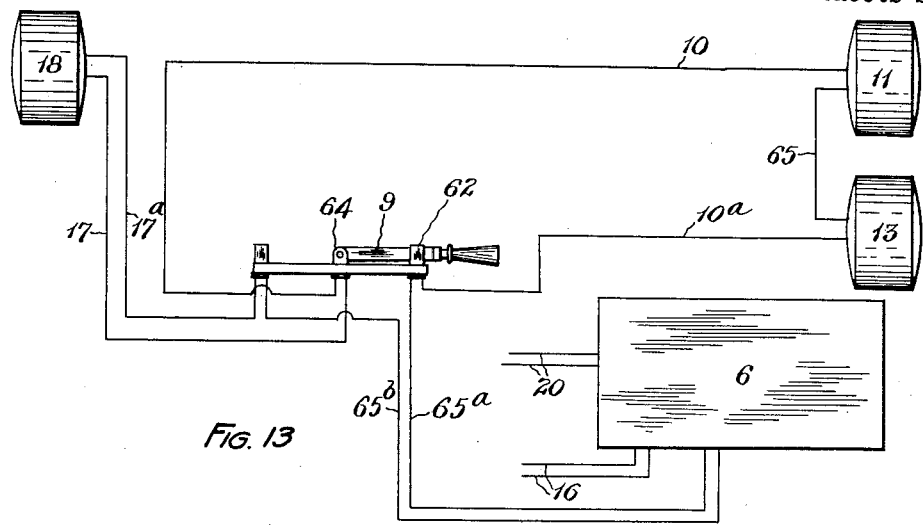
Figure 14:
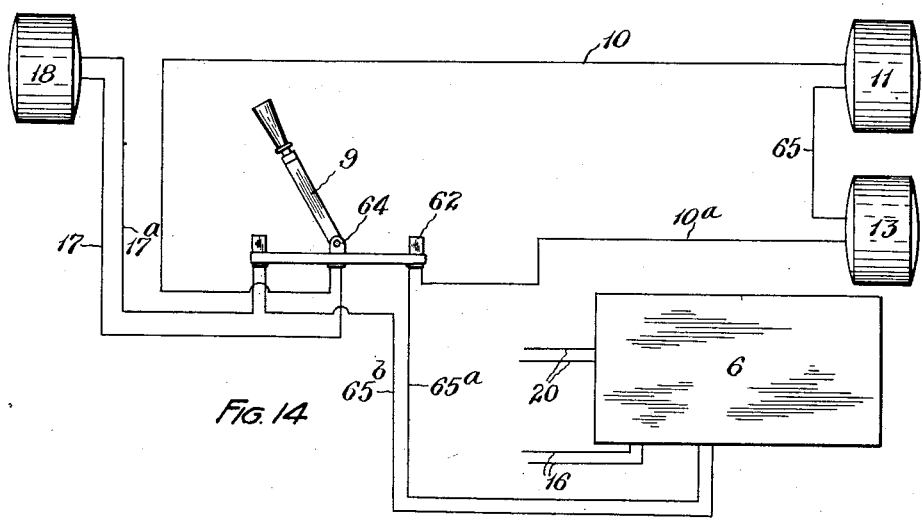
Figure 15:
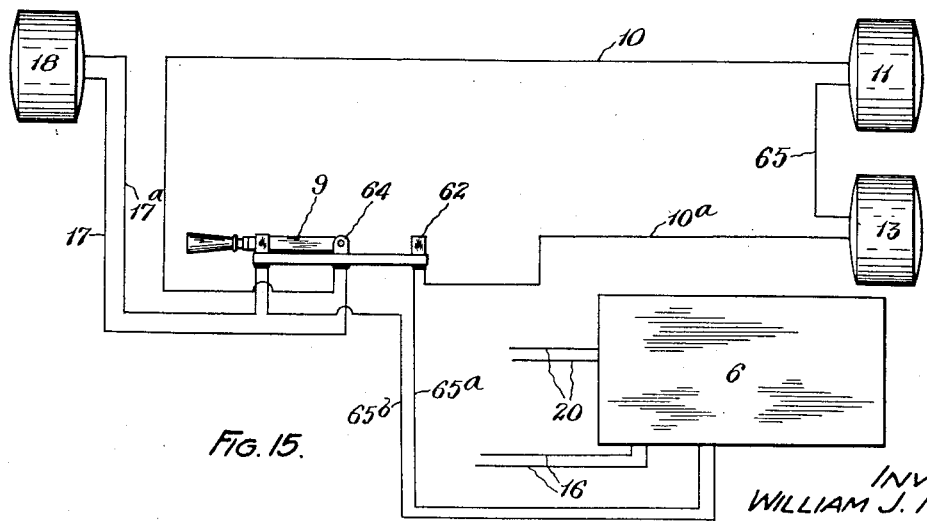

Figure 12 is a diagrammatic view, showing the wiring arrangement and electrical connections of the several elements; and Figures 13, 14, and 15 show a series of three different positions for a switch which controls the micro-generators and wiring arrangements, illustrating the resultant effects of these different switch positions upon the hook-up of the swell-organ and choir-organ micro-generators, and a console micro-generator.

Referring to the annexed drawings in which the same parts are designated by the same respective ordinals in the several views, the main auditorium of a church is designated by the ordinal 103, 23 being a choir room in which the choir usually gathers before the services commence, 32 and 31, respectively, being the doors leading into and from a corridor 130 connecting the choir chamber 23 and the main auditorium 103. Opposed rows of pews 98 are separated by a central aisle 99 down which the choir marches to its seats 100 shown, for purposes of illustration, as positioned adjacently forward of the pipe organ console 66' and under the organ pipes.

Figures 5, 6:
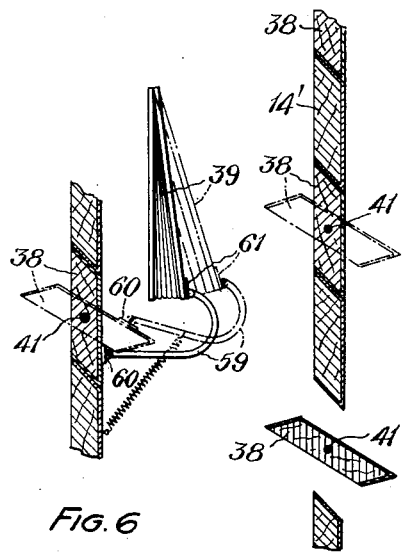
Figure 5 is a plan sectional view, upon an enlarged scale, of a fragmentary portion of one of the pivoted sound-controlling shutters provided for the swell-box and choir organ compartments of the pipe organ.
Figure 6 is a fragmentary view illustrating how the shutters of the swell-chambers are operated, the same being opened from the organ console by electro-pneumatic operating means.
Figure 2:
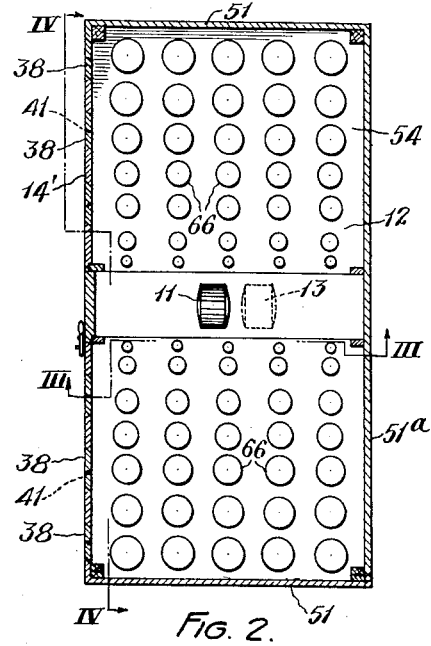
Figure 2 is a view, upon an enlarged scale, taken in the plane of Figure 1, of the swell-box of the pipe organ shown in Figure 1, showing the pair of micro-generators in the pipe organ, and the sound-controlling shutters.
Figure 4:
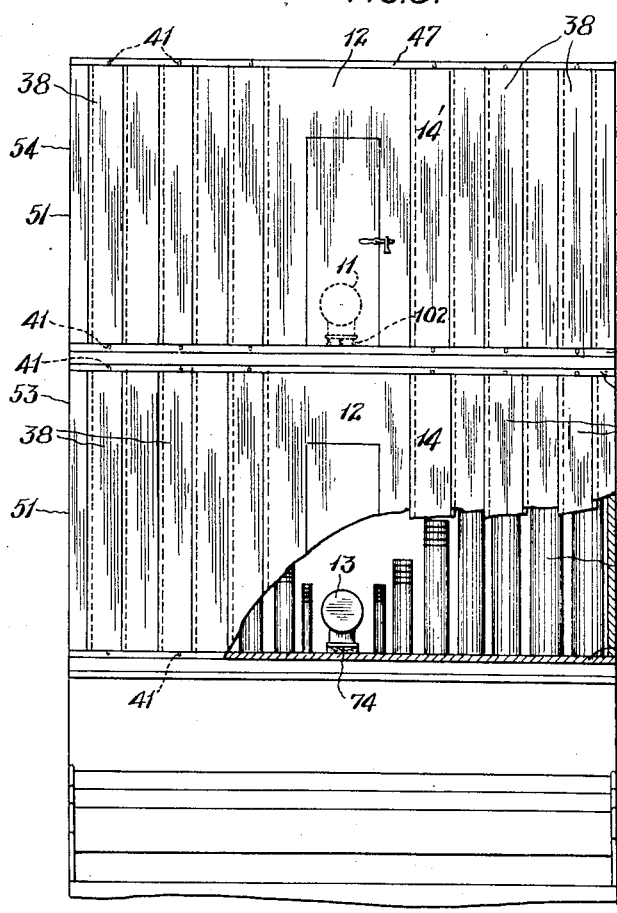
Figure 4 is a front elevation of these organ pipe compartments, the front wall being partially broken away to show a fragmentary transverse vertical section, as indicated by the line IV—IV, Figure 2.
Figure 3:
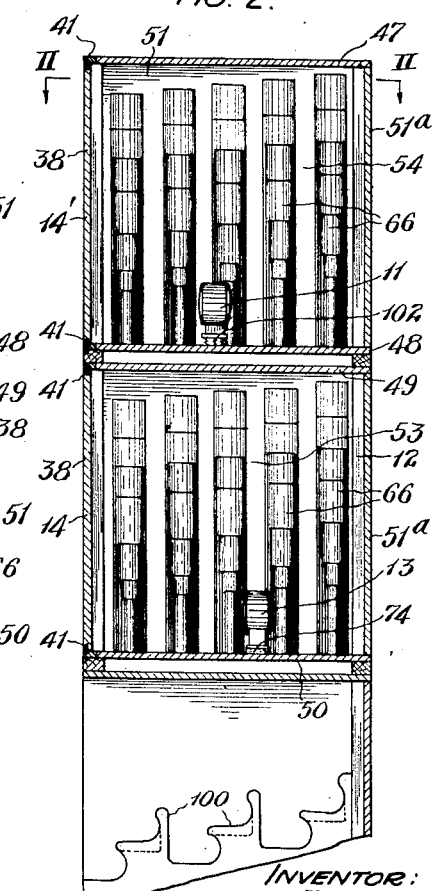
Figure 3 is a vertical section, taken on the planes indicated by the line III—III, Figure 2, the same being through the upper swell-box and the lower choir organ pipe compartments of the pipe organ.

At the beginning of the services, the organist closes a console power switch 3 which directs electric current from a power line 2 into my apparatus, it being assumed that a main switch 1 is closed which connects the city power line 37 of 110 voltage. The organist then throws a switch blade 9 into a neutral position, as shown in Figure 14, thus connecting a console micro-generator 18, and two organ chamber micro-generators 11 and 13 with the amplifier 6 which, in turn, is connected with an electro-pneumatic echo organ 21 located in the choir room 23. The sound waves are transmitted from the micro-generators 18, 11, and 13 by means of circuits to be described hereinafter to the audio-amplifier 6 and thence over the amplifier circuit wires 20 to electro-pneumatic echo organ 21, as plainly shown in Figures 1 and 12. The organist, who is seated upon the bench 29 and from there can operate the various switches and other controls shown and described then announces to the choir through the medium of the micro-generator 18 and the electro-pneumatic echo organ 21 that he is ready to start the processional and transmits any other desired information. Then the organist sets a console volume control switch 15, Figure 12, which is connected to the audio-amplifier 6 by circuit 16, at the point which will reproduce the sound of the choir organ by the electro-pneumatic echo organ 21 in the choir room 23 at the desired volume. Then the organist throws switch 9 into the position shown in Figure 15 (hereinafter fully explained), and the organ 66 is then played and shutters 38, Figures 5 and 6, provided upon the sound-proof chamber 12 may be closed so that the organ music will not be heard by the congregation. The organ sound waves are transmitted to and made audible in the choir room 23 by means of the micro-generators 11 and 13 located in the sound-proof compartments 54 and 53, the circuit connections, the amplifier 6, and the electro-pneumatic echo organ 21.

It should be understood that in the use of that form of my apparatus shown in the accompanying drawings, and herein described, the choir is considered as having gathered in the room 23 and commenced therein the singing of the processional which is completed during the march from the choir room 23 to the seats 100 and the seating of the choir therein. It is also assumed that the choir room 23 is so situated relative to the organ pipes 66 that it would be difficult or even impossible for the choir so to catch the sounds from the pipes as to be assured of entering the auditorium 103 in tune and time with the organ Sound compartment 54 contains what is known as the swell organ and sound compartment 53 contains what is known as the choir organ. The micro-generators 11 and 13 are placed in these compartments, respectively, preferably between the high pitched pipes so as more readily to pick up the high pitched notes usually difficult to pick up. In order that the micro-generators 11 and 13 may not be subject to vibration, I mount them upon some resilient base, such as springs 102 as illustrated in the case of the micro-generator 11, or on a heavy felt 74, as illustrated in the case of the micro-generator 13. The sound-proof compartments 53 and 54 are formed by the tops 47 and 49, sides 51, bottoms 48 and 50, back member 51$^a$ and front members 14 and 14' to form the swell chamber 12 complete. The front members 14 and 14' contain the series of felt-lined shutters 38 pivoted to the tops and bottoms of the chambers 53 and 54, respectively, by means of the pivot pins 41. These shutters 38 are operated by means of bellows 39 which are connected with the shutters 38 by means of the brackets 60 and 61 and spring-controlled curved links 59. The dot-and-dash portions of Figures 5 and 6 show the shutters 38 in open position.

The power current from conductor 4 is transmitted to the audi-amplifier 6 by means of the conducting wires 5 and 5$^a$ to the B-eliminator. The power for the electro-pneumatic echo organ is trasmitted thru the wires 4 to the socket 120, thence to the plug 34, Figures 1 and 12, and then to the electro-pneumatic echo organ 21 through the extension wire 4$^a$, socket 83, Figure 7, and wire 4$^b$, Figure 12. The sound waves which are transferred to the electro-pneumatic echo organ 21 from the micro-generator 18 are transmitted in the manner and by the means described with this exception, that when only the sound waves picked up by the micro-generator 18 are to be reproduced, then the micro-generator control switch 9 engages the terminal post 62 as shown in Figure 13, this post 62 being thus connected to a terminal post 64 and conducting wire 17, thence to the micro-generator 18 and back to the audio-amplifier 6 through the conducting wires 17$^a$ and 65$^b$.

Figure 1:
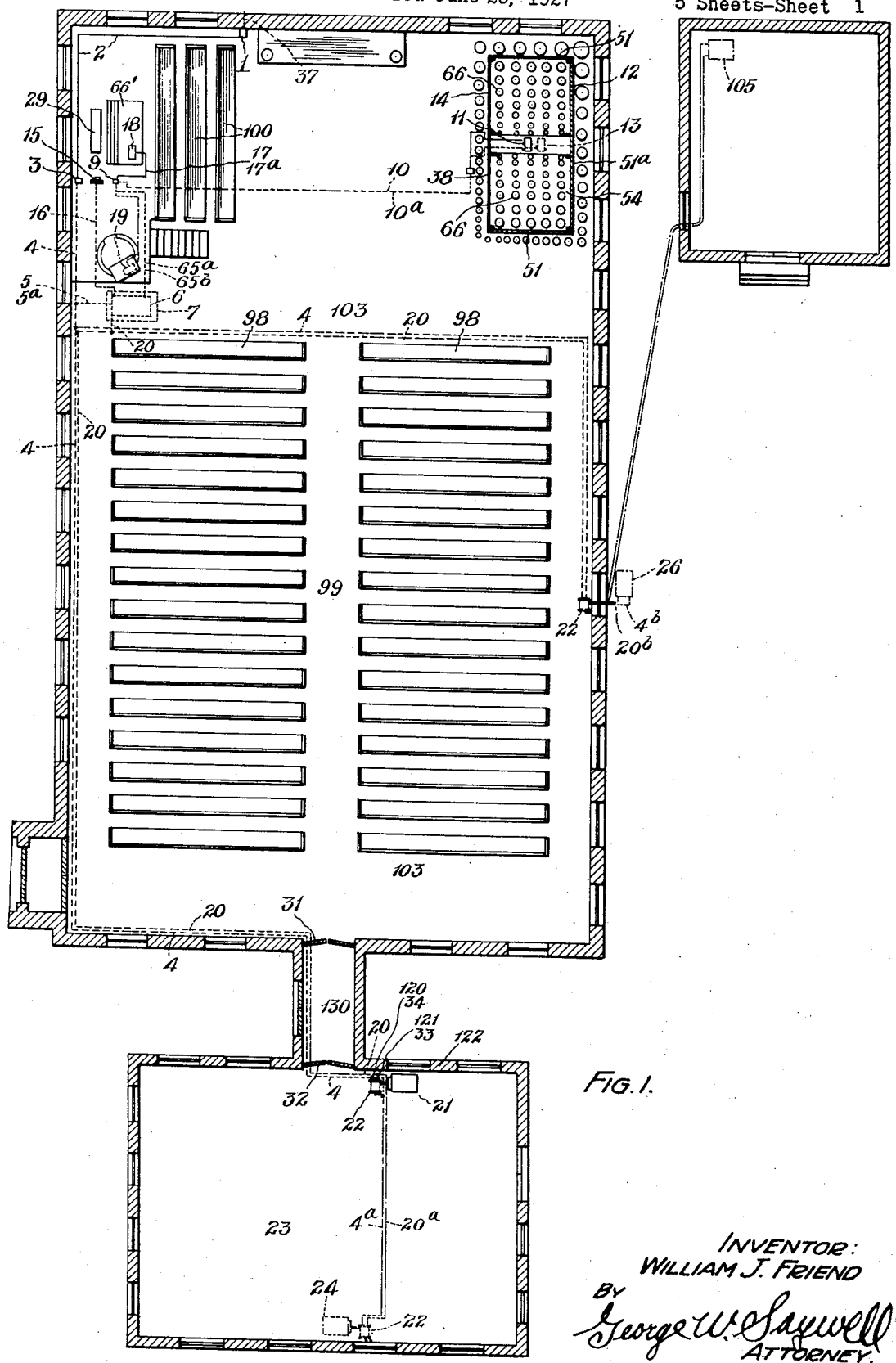
Figure 1 is a general plan sectional view showing my improved apparatus installed in a church and an adjoining choir room, there also being shown in dot-and-dash lines some alternate locations for the electro-pneumatic echo organ in a recreation hall, and out-of-doors, and alternate locations of other apparatus.
Figure 8:
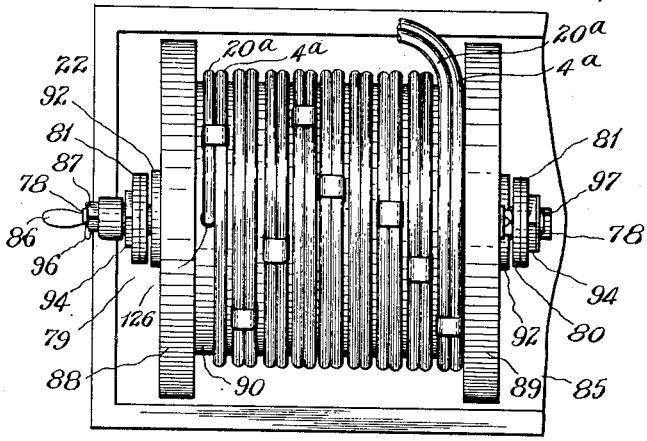
Figure 8 is a plan view of the reel shown in Figure 7.
Figure 7:
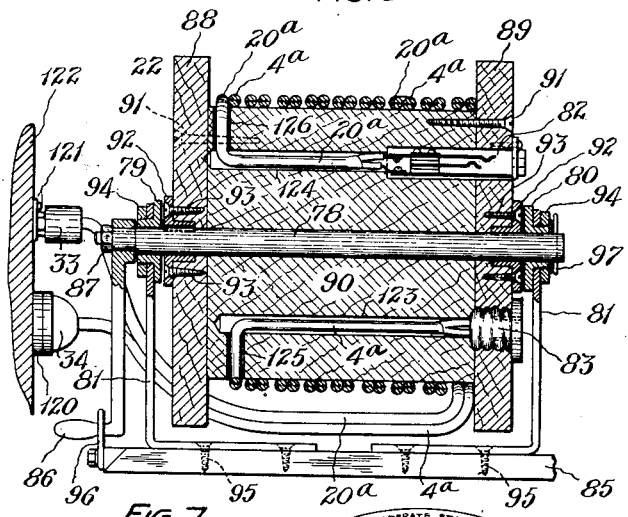
Figure 7 is a vertical longitudinal section, taken in the plane indicated by the line VII—VII, Figure 9, through an extension reel provided for varying the position of the electro-pneumatic echo organ.
Figure 9:
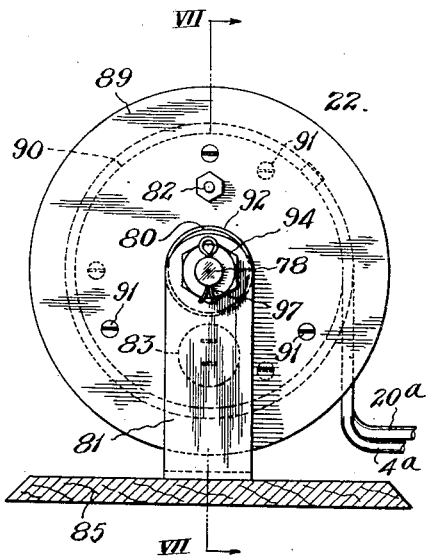
Figure 9 is a side elevation of the reel shown in Figure 7.

Provision is made for conveniently moving the electro-pneumatic echo organ to any desired position. This permits the reproduction of the sounds from the pipe organ at varied points within or outside of the auditorium; also permits flexibility of position for the amplification of sermons or lectures, the directing of choirs in a choir room by the choir-master while sitting at the organ console in the church auditorium proper, and other adaptations to suit varied needs. Referring particularly to Figures 7, 8, and 9, I therein show special means for locating the electro-pneumatic echo organ 21 in varying positions. The dot-and-dash line positions 24—26 and 105 of the loud speaker in Figure 1 illustrate a number of the different positions in which it may be used. This flexibility of use of the loud speaker is obtained by the use of an intermediately positioned reel 22 which is provided with extension cords of material length wound thereon and provided with means for connecting the respective ends of the same to the power line and to the audio-amplifying circuit, as also to the power unit and amplification circuit of the electro-pneumatic echo organ. The reel 22 is formed with a base 85 to which are secured by means of screws 95 a pair of vertically-extended brackets 81 within which is rotatably mounted a shaft 78 by means of externally-threaded flanged hubs 79 and 80 and lock nuts 94. Keyed to the shaft 78 are flanged hub members 92 which are secured by screws 93 to a pair of opposed vertically-extended plates 88 and 89 forming the side plates of a core 90 to which they are secured by screws 91. Assuming that the power line 4 and the audio-amplification line 20 is extended to the respective sockets 120 and 121 provided in the building wall 122, I utilize a power cord 4$^a$ and a loud speaker cord 20$^a$ of considerable length provided respectively with plugs 34 and 33 adapted to engage the sockets 120 and 121, these cords 20$^a$ and 4$^a$ being wound in alternate relation upon the core 90, and taped together, as plainly shown in Figures 7 and 8. The core 90 is formed with two longitudinally-extended holes 123 and 124 which connect with a pair of transverse holes 125 and 126 respectively, the respective ends of these holes being open so as to respectively provide passages through portions of the core 90, and the cords 4$^a$ and 20$^a$ pass through these holes and terminate respectively in a socket 83 adapted to accommodate a 110-volt power wire of the electro-pneumatic echo organ and a socket 82 adapted to accommodate the electro-pneumatic echo organ input cord. These connections for the sockets 82 and 83 are plainly shown in Fig. 12 and consist of the cords 4$^b$ and 20$^b$ respectively which are plugged into the electro-pneumatic echo organ 21. A crank 86 is keyed to the shaft 78 to provide a convenient means for turning the reel 22 and winding or unwinding the cables as desired, a lock 96 being secured to the frame 85 and providing means for retaining the handle 86 when not in use. The handle 86 is retained upon the shaft 78 by means of the lock nut 87, and the lock nut 94 and the bracket 81 and associated elements at the opposite end of the shaft 78 are retained by means of the cotter pin 97.

The active connection of all three micro-generators 18, 11 and 13 together is shown in Figure 14, wherein it will be noted that the switch blade 9 occupies a neutral position and the several circuit connections with the amplifier 6 are as therein shown. The connection of the micro-generators 11 and 13 alone to the balance of my transmitting and reproducing mechanism is effected by throwing the switch 9 into the position shown in Figure 15 wherein it will be noted that the console micro-generator 18 is thus thrown out of circuit, being short circuited, and the current from the micro-generators 11 and 13 is conducted by means of the wires 65—10$^a$ and 65$^a$ to the amplifying means of the audio-amplifier 6, the circuit being completed by conductor 10; and then to the electro-pneumatic echo organ 21 through the conducting wires 20, the socket 121, Figure 12, the plug 33, the extension cords 20$^a$, the latter being wound around a reel 22 and connected to the plug 82, Figure 7, then through wire 20$^b$ to the electro-pneumatic echo organ 21.

Figure 10:
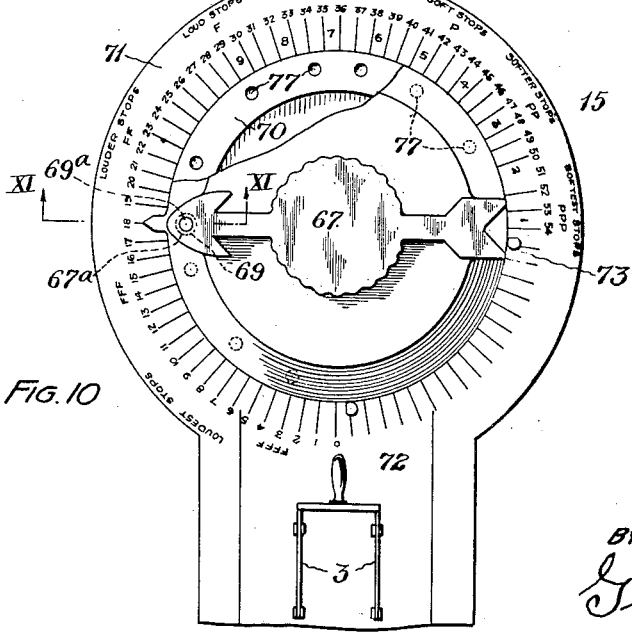
Figure 10 is a fragmentary elevation, upon an enlarged scale, of a dial for controlling from the console the intensity of loudness of the reproduced music, a console main power line switch being also shown.
Figure 11:
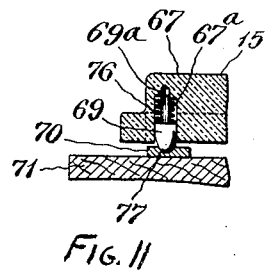
Figure 11 is a fragmentary section, taken in the plane indicated by the line XI—XI, Figure 10.

In Figures 10 and 11, some detail of the console volume control device 15 is shown, and the same comprises a graduated dial base 71 supporting a raised annulus 70 having recesses 77 to receive a plunger 69 held downwardly by a coiled spring 76 contained within a recess 67$^a$ formed in the head of an indicating arrow 67, the spring 76 encircling a plunger spindle 69$^a$ mounted in the arrow-head 67. The dial 71 is graduated and marked by words and numerals so that the organist may know the position in which to locate the arrow 67 to obtain the desired results. The balance of the console volume control, being old, is not shown in detail but, as shown diagrammatically in Figure 12, consists of a finger 67' mounted on the same shaft with arrow 67 engaging contact points 77' connected to a coil of resistance wire 30, Figure 12, at various spaced positions, this resistance wire 30 being connected at one end to one of the circuit wires 16, and the contact arm 67' being connected at its axis to the other circuit wire 16. Stationary stops 72 and 73 are provided to prevent the arrow switch 67 from being turned too far in either direction.

An amplifier volume control 127 is also provided, similar in make-up to the console volume control 15. This control 127 is a base control and is set at that point which will give the proper loudness for the softest sounding organ stop when the arrow arm 67 of control 15 is set at stop 73, Figure 10. Then the loudness is governed, as other stops are added, by the console control 15.

An alternate position for the console micro-generator in the pulpit 8 is indicated by the ordinal 19 and the same is particularly serviceable when the auditorium 103 is overcrowded and a portion of the audience must be seated in a chapel or other auxiliary auditorium.

The audio-amplifying apparatus 6 is preferably located in the basement and I provide a vibrationless support therefor, as illustrated by the masonry pier 7, Figure 1.

The line wires which connect the electro-pneumatic echo organ and the micro-generators with the audio-amplifying transformer system are B X wires for the 110 volt power, and Bell wire and lamp cord for the pick-up of the sound impulses.

By the use of my apparatus the electro-pneumatic echo organ vibrates in sympathy with the main or pipe organ, the time or rhythm being the same, and the identical pitch or frequency being obtained. The quality of the reproduced music is extremely good and there is no difficulty with static, unless the organ has a pneumatic leak. My improved apparatus provides for absolutely controlling the loudness so that the sound coming from the pipe organ in the auditorium can be shut off from the hearing of the congregation, while the electro-pneumatic echo organ at a distant point can be made to sound in any degree of loudness desired. In my apparatus this regulation is conveniently located near the organ console so that the organist can quickly reach and adjust the apparatus for different organ effects and varieties of intensities depending upon how many and which organ stops are being played. The sounds from the pipe organ and the electro-pneumatic echo organ blend perfectly so that it is quite difficult to tell from what direction they are coming, the sounds filtering together and swirling around the congregation when the apparatus is properly tuned and adjusted.

One great advantage of the described apparatus is, that it picks up all the tones from all of the many stops of the pipe organ, thereby providing a greater variety of quality than is obtainable when an electro-pneumatic echo organ is used that is limited to the sounds from one set of pipes only; also eliminating a great amount of the time and expense involved in construction, and requiring a less amount of space for installation.

What I claim is:

1. In apparatus of the character described, the combination with a pipe organ having a swell chamber; of a micro-generator located adjacent the organ console, a second micro-generator located within said swell chamber, an audio amplifier electrically connected to said micro-generators, an echo organ electrically connected to said amplifier, and a switch adapted to cut either of said micro-generators out of the circuit and to throw them both into the circuit, as desired.

2. In apparatus of the character described, the combination with a pipe organ having a swell chamber forming compartments for the swell stops of the organ pipes and the stops of the choir organ pipes, respectively; of a micro-generator located adjacent the organ console, a pair of micro-generators located respectively in said chamber compartments adjacent the high pitched pipes, an audio amplifier electrically connected to said micro-generators, an echo organ electrically connected to said amplifier, and a switch adapted to throw all of said micro-generators into the circuit and to cut said console micro-generator or said pair of swell chamber micro-generators out of the circuit, as desired.

3. In apparatus of the character described, the combination with a pipe organ having a swell chamber; of a micro-generator located within said swell chamber, an audio amplifier electrically connected to said micro-generator, an echo organ, a power line connected to said audio amplifier and said echo organ, said echo organ being electrically connected to said audio amplifier, and volume control means disposed adjacent the organ console and electrically connected to the audio amplifier.

4. In apparatus of the character described, the combination with a pipe organ having a swell chamber; of a micro-generator located within said swell chamber, an audio amplifier electrically connected to said micro-generator, an echo organ, a power line connected to said audio amplifier and said echo organ, said echo organ being electrically connected to said audio amplifier, primary volume control means disposed adjacent said audio amplifier, and secondary volume control means disposed adjacent the organ console, both of said control means being electrically connected to said audio amplifier.

5. In apparatus of the character described, the combination with a pipe organ having a swell chamber; of a micro-generator located within said swell chamber, an audio amplifier electrically connected to said micro-generator, an echo organ, and a power line connected to said audio amplifier and said echo organ, said echo organ being electrically connected to said audio amplifier.

6. In apparatus of the character described, the combination of a pipe organ having a swell chamber, means for rendering said chamber sound-proof or open, as desired, a micro-generator located within said swell chamber, an audio amplifier electrically connected to said micro-generator, an echo organ, and a power line connected to said audio amplifier and said echo organ, said echo organ being electrically connected to said audio amplifier.

7. In apparatus of the character described, the combination with a pipe organ having a swell chamber, a micro-generator resiliently-mounted in said swell chamber, an audio amplifier electrically connected to said micro-generator, an echo organ, a power line connected to said audio amplifier and said echo organ, said echo organ being electrically connected to said audio amplifier, and volume control means disposed adjacent the organ console and electrically connected to the audio amplifier.

8. In apparatus of the character described, the combination with a pipe organ having a swell chamber; of a micro-generator located within said swell chamber, an audio amplifier electrically connected to said micro-generator, a vibrationless support for said audio amplifier, an echo organ, and a power line connected to said audio amplifier and said echo organ, said echo organ being electrically connected to said audio amplifier.

9. In apparatus of the character described, the combination of a pipe organ having a swell chamber, means for rendering said chamber sound-proof or open, as desired, a micro-generator located within said swell chamber, an audio amplifier electrically connected to said micro-generator, an echo organ, and a power line connected to said audio amplifier, extension means electrically connected to said power line and said audio amplifier, power and audio-amplification conductors connecting said extension means and said echo organ, and volume control means electrically connected to the audio amplifier.

Signed by me this 20th day of June, 1927.

WILLIAM J. FRIEND.